US012380371B2

(12) United States Patent
Chung et al.

(10) Patent No.: US 12,380,371 B2
(45) Date of Patent: *Aug. 5, 2025

(54) OPTIMIZING A RESERVATION USER INTERFACE

(71) Applicant: Omnissa, LLC, Mountain View, CA (US)

(72) Inventors: Kira Chung, Atlanta, GA (US); Ajayan Subramanian, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,777

(22) Filed: Aug. 10, 2023

(65) Prior Publication Data

US 2023/0385716 A1 Nov. 30, 2023

Related U.S. Application Data

(63) Continuation of application No. 17/452,127, filed on Oct. 25, 2021, now Pat. No. 11,763,211.

(51) Int. Cl.
*G06Q 10/02* (2012.01)
*G06F 3/0484* (2022.01)

(52) U.S. Cl.
CPC ........... *G06Q 10/02* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 10,860,954 B1 * | 12/2020 | Yeluguri | G06F 18/21 |
| 2002/0099576 A1 | 7/2002 | MacDonald et al. | |
| 2003/0171965 A1 * | 9/2003 | Ratzlaff | G06Q 10/1093 |
| | | | 705/7.18 |
| 2003/0191772 A1 * | 10/2003 | Schaumann | G06Q 10/109 |
| | | | 707/999.102 |
| 2007/0162315 A1 | 7/2007 | Hodges | |
| 2008/0183511 A1 * | 7/2008 | Handler | G06Q 30/02 |
| | | | 705/5 |
| 2008/0222566 A1 * | 9/2008 | Daughtrey | G06F 16/2428 |
| | | | 715/764 |
| 2016/0285785 A1 | 9/2016 | Thye | |
| 2016/0342955 A1 | 11/2016 | Brock et al. | |
| 2017/0357949 A1 | 12/2017 | Patel et al. | |
| 2018/0349557 A1 | 12/2018 | Li et al. | |
| 2020/0242670 A1 | 7/2020 | Thye | |
| 2021/0065069 A1 * | 3/2021 | Yeluguri | G06Q 10/02 |

* cited by examiner

*Primary Examiner* — Henry Orr
(74) *Attorney, Agent, or Firm* — Kim & Stewart LLP (57) ABSTRACT

Various examples are described for optimizing a reservation workflow in a user interface. In a calendar user interface element, a user can move from a single day reservation to multi-day reservation without having to choose a multi-day reservation to begin the reservation workflow. Additionally, the user interface can instantly recover from an unavailable booking without requiring the user to navigate to another user interface to select an alternative booking.

16 Claims, 10 Drawing Sheets

Figure 1:
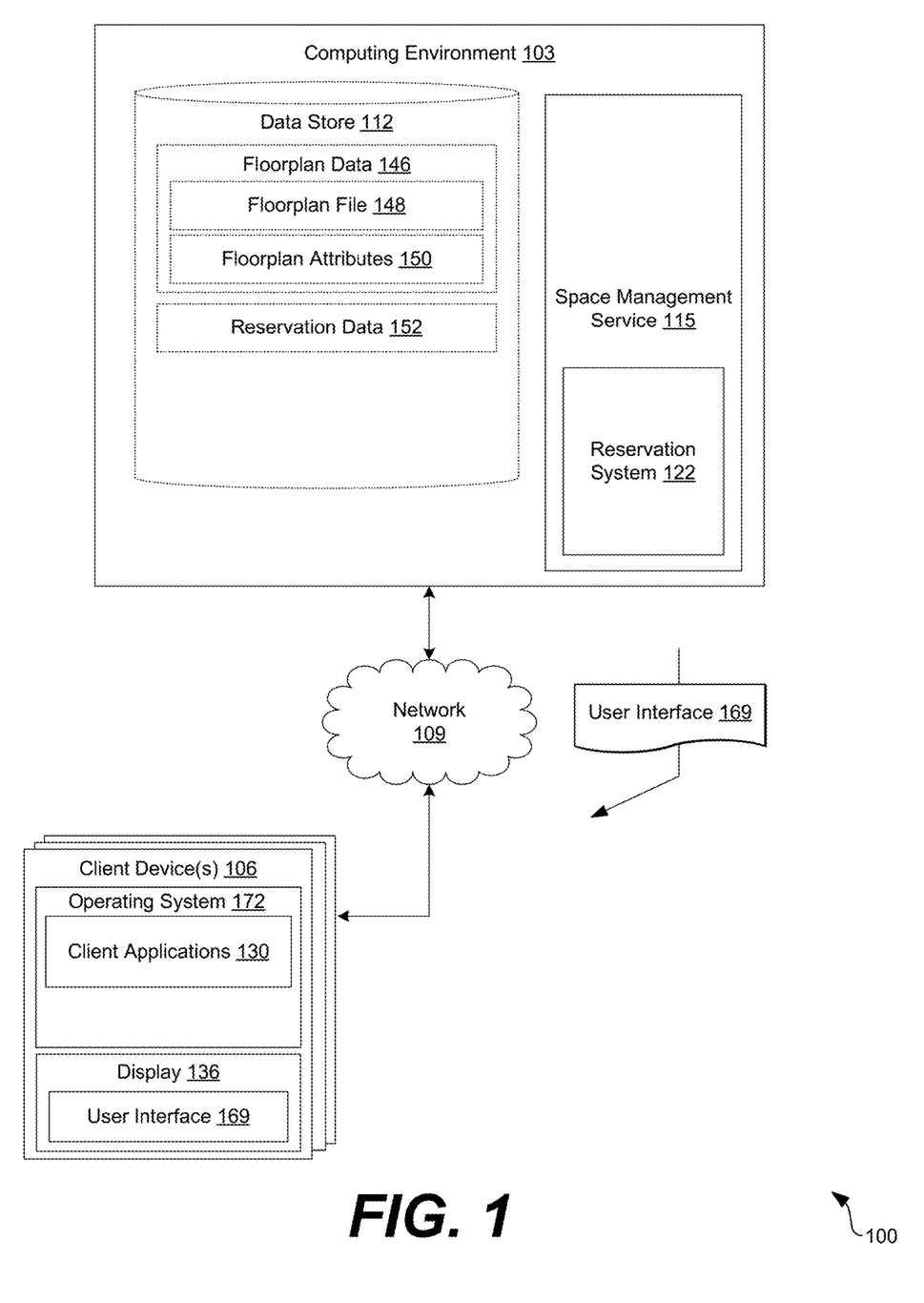

OPTIMIZING A RESERVATION USER INTERFACE

CROSS-REFERENCE TO RELATED APPLICATIONS

This application is a continuation of and claims the benefit of U.S. patent application Ser. No. 17/452,127, entitled "OPTIMIZING A RESERVATION USER INTERFACE," and filed Oct. 25, 2021, which is hereby incorporated by reference in its entirety.

BACKGROUND

Tools that assist with managing a physical environment in an enterprise often allow users of the enterprise to book or reserve physical locations, such as offices, conference rooms, desks, cubicles, and other physical locations. A reservation system can provide a user interface in which a user can select a single day reservation or a multi-day reservation as well as select a physical location that the user wishes to reserve.

The reservation system can also allow the user to view past reservations and book the same physical location that the user has previously reserved. For example, if a user, when visiting a certain site within an enterprise, has booked a particular office or cubicle, the reservation system can allow the user to rebook the same office or cubicle when returning to the site at a later date.

However, selection of a single day versus a multi-day reservation in a reservation system can be a cumbersome process. Additionally, reserving a previously-reserved site can also be a cumbersome process when the previously-reserved site is unavailable for a requested day or date range.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a drawing of a networked environment according to examples of the disclosure.

FIG. 2 is an example user interface according to examples of the disclosure.

FIG. 3 is an example user interface according to examples of the disclosure.

FIG. 4 is an example user interface according to examples of the disclosure.

FIG. 5 is an example user interface according to examples of the disclosure.

FIG. 6 is an example user interface according to examples of the disclosure.

FIG. 7 is an example user interface according to examples of the disclosure.

FIG. 8 is an example user interface according to examples of the disclosure.

FIG. 9 is a flowchart showing an example operation of a space management service according to various examples.

FIG. 10 is a flowchart showing an example operation of a space management service according to various examples.

DETAILED DESCRIPTION

The present disclosure relates to optimizing a reservation system user interface. In some examples, the user interface can be one that is generated to allow users to reserve physical locations in a reservation system. Enterprise office environments are increasingly moving towards "hot desks" or temporary physical locations that employees and contractors can utilize as and when they are needed. These physical locations can have varying attributes, equipment, or capabilities. Some locations might be cubicles, offices, conference rooms, meeting spaces, or other locations that can be provided in an office environment.

Some locations within a facility can be associated with attribute data. For example, a location can be associated with different types, such as an office, conference room, cubicle, desk, or other types of locations within an office environment. Additionally, a location can be associated with attributes, such as the type or quantity of seating available, whether the location is reservable, technology resources associated with the location, such as the type or quantity of displays, conference room technology, and other resource attributes.

The reservation system can allow a user to select a site associated with an enterprise, such as a particular city, campus, building, or floor. The reservation system can then allow the user to reserve a physical location on a particular date or a date range within the site. The reservation system, in some cases, can be provided by a space planning tool in which space planners can design a floorplan, define attributes for locations within the floorplan, specify locations that are reservable by users. The space planning tool can also facilitate assignment or reservation of areas and resources within an office environment.

A user interface provided by the reservation system can include a calendar user interface element in which the user can select a single day in the event that the user desires to make a single day reservation of a location within a site. The calendar user interface element can allow the user to select a second day, and the reservation system can modify the reservation to a multi-day reservation without further interaction required of the user. In other examples of a user interface, the user is required to decide before viewing a calendar whether the user desires a single day or a multi-day reservation.

According to examples of the disclosure, the user interface can allow the user to move from a single day selection to a multi-day selection in the calendar by selecting a second day. Therefore, the user can move from a single day selection to a multi-day selection in the calendar without additional user interaction beyond selecting the second day in the user interface, thereby optimizing the reservation workflow for users.

Additionally, examples of the disclosure can provide a user interface that allows a user to view previous reservations made for certain physical locations at a site. The user can select a previous reservation and attempt to reserve the same physical location on a new date or date range. If the physical is unavailable over the selected date or date range, the user interface can instantly provide alternative suggestions without requiring additional user interaction from the user, thereby optimizing the reservation workflow for users.

Turning now to FIG. 1, an example of a networked environment 100 is shown. The networked environment 100 can include a computing environment 103 and one or more client devices 106 in data communication with one other over a network 109. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include one or more computing devices that are arranged, for example, in a server bank, computer bank, or other arrangement. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a space management service 115 as well as other applications, services, processes, systems, engines, or functionality not discussed in detail herein. The space management service 115 can also execute a reservation system 122 that can provide a user interface 169 to a client device 106 of a user attempting to make a reservation. In some examples, the user interface 169 can also be generated by an application running on a client device 106 that communicates with the reservation system 122 to make reservations using the space management service 115.

The space management service 115 can allow an administrator to manage office space in an enterprise environment. The space management service 115 can allow administrators to visualize a floorplan corresponding to a floor of an office space environment. The space management service 115 can also allow administrators to assign locations or resources within a floorplan to users. The space management service 115 can also allow administrators to define properties or resources that are associated with locations on a floorplan.

The reservation system 122 can again facilitate reservation of physical locations by users within an office space environment. Users of the enterprise can select a site managed by the space management service 115 and view available physical locations on a single day or over multiple days defined by a date range. space management service 115 can generate a user interface 169 that can be provided to an administrator via a client device 106.

The user interface 169 can be rendered by the client devices 106 in a browser or in a special purpose application running on a client device 106. According to aspects of the disclosure, the user interface 169 can make interaction with a calendar user interface element within the user interface 169 more efficient by speeding selection of multi-day reservation as well as alternative location bookings when a primary location is unavailable to be booked.

The data stored in the data store 112 can include, for example, floorplan data 146 as well as other data. Floorplan data 146 can include data pertaining to a floorplan that can be managed using the space management service 115. The floorplan data 146 can include information about a particular floorplan that is provided to the space management service 115. Floorplan data 146 can include a floorplan file 148 that is a visual representation of a floorplan corresponding to one or more floors in a facility that can be managed by the space management service 115. The floorplan file 148 can be a portable document format (PDF) file that includes a visual representation of a floorplan. The visual representation can comprise a line drawing or schematic drawing of a floorplan. The floorplan file 148 can also be an image file or another file type in which a visual representation of a floorplan can be embedded. The floorplan file 148 can also include text identifiers that identify respective locations in a floorplan. The text identifiers can be embedded as text within a PDF, for example, or the space management service 115 can perform optical character recognition (OCR) to extract text identifier identifying locations within the floorplan file 148. A text identifier identifying a location can represent an identifier that is unique with respect to other identifiers in a floorplan or with respect to all floorplans associated with a given enterprise.

Floorplan data 146 can also include floorplan attributes 150. Floorplan attributes 150 can represent information about a floorplan that can be managed using the space management service 115. Floorplan attributes 150 can include a type associated with the location, such as whether there is a desk, a type of desk. The floorplan attributes 150 can also specify whether the location is an office, cubicle, a conference room. The floorplan attributes 150 can also specify a text identifier associated with a location. Floorplan attributes 150 can further specify features or other properties of a location, such as whether there are display devices available to be used, how many devices are available, whether there is a printer, additional seating, and other aspects of a location that can be specified within an office environment.

Floorplan attributes 150 can further specify whether a physical location is reservable by users in the enterprise. Some physical locations on a floorplan may not be user reservable, while others in a floorplan can be reserve by users on a given date or date range.

Reservation data 152 can include data associated with reservations made by users of the enterprise. Reservation data 152 can specify whether a particular physical location is reserved by a user on a given date or date range. Reservation data 152 can also include historical reservation information. Reservation data 152 can include a user identifier associated with a user that reserved a physical location as well as an identifier associated with the reserved location. The reservation system 122 can allow users to create new reservations and view historical reservation information that is stored as reservation data 152. The reservation system 122 can provide a user interface 169 through which users can generate new reservations for a single day, multiple days, and also view historical reservation data. The user interface 169 can be provided through a web based portal and rendered on a client device 106 by a browser. In alternative examples, the user interface 169 can be generated by an application running on the client device client device 106, such as a mobile application.

The user interface 169 can include a calendar user interface element that can allow a user to select a multi-day user interface element by selecting a two dates in the calendar rather than forcing the user into a multi-day workflow before providing the calendar in the user interface 169. Additionally, the user interface 169 can allow the user to create a new reservation from a previous reservation of a physical location in the user's respective reservation data 152. If the physical location is unavailable on the user's selected days, the user interface 169 can include alternative physical locations that within the user interface 169 without requiring further user interaction with the user interface 169, which can speed the reservation workflow for the user.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 172 configured to execute various client applications 130. A client application 130 can comprise a native application that is utilized by users to access availability information for locations at an enterprise physical site. The client application 130 can facilitate reservations of these physical locations and can implement a user interface 169 according to examples of the disclosure. In other examples, a client application 130 can include a browser, and a user interface can include a network page generated by the reservation system 122 and transmitted to the client application 130 over the network 109. Further, other client applications 130 can include device management applications, enterprise applications, social networking applications, word processors, spreadsheet applications, media viewing applications, or other applications.

Figure 2:
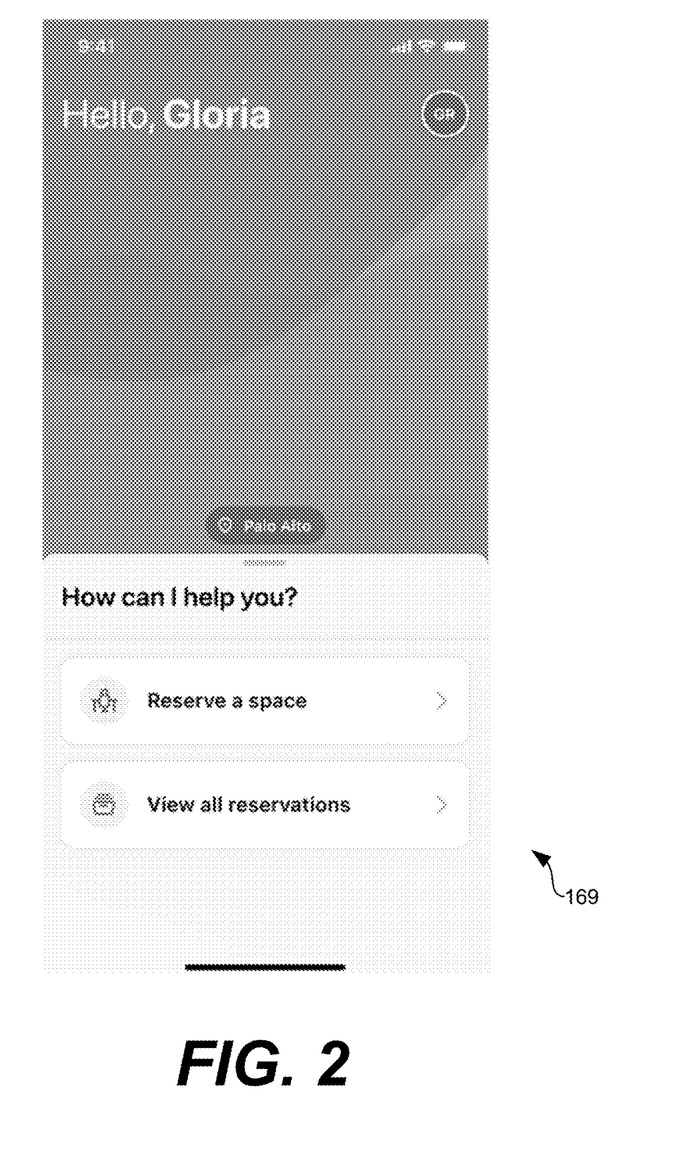

Referring next to FIG. 2, an example of a user interface 169 is shown. More specifically, the user interface 169 of FIG. 2 can include a user interface that facilitates user reservation of physical locations in an office environment. In the example of FIG. 2, the user has arrived at a landing page for the reservation system 122 for a particular site within the enterprise.

The reservation system 122 can allow users to reserve locations in various enterprise sites. An enterprise site might comprise multiple buildings or floors at the site. The buildings or floors can include multiple physical locations that the user can reserve. The landing page of the user interface 169 can allow the user to select a space to reserve or view current and past reservations associated with the user.

Figure 3:
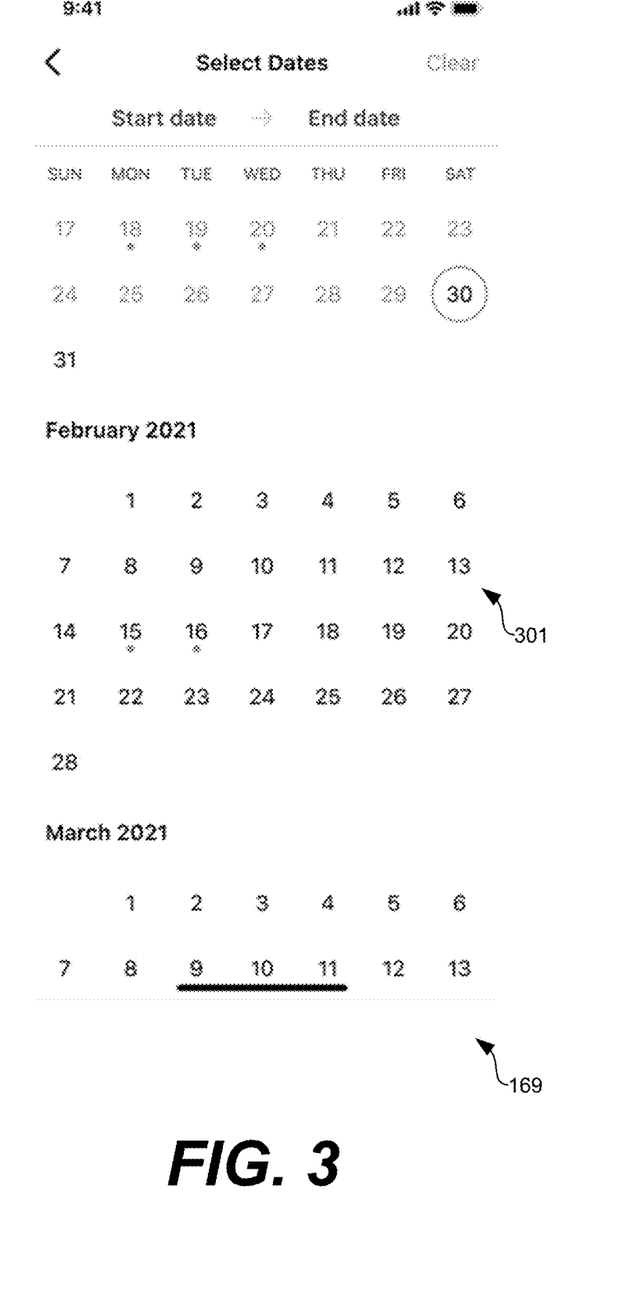

Continuing the example of FIG. 2, reference is now made to FIG. 3. In FIG. 3, the user has selected the option to create a new reservation and landed on a calendar user interface element 301. In one example, the user can select a physical location prior to landing on the calendar user interface element 301. In other examples, the user can select a date for a reservation within the calendar user interface element 301 before selecting a physical location for reservation. In examples of the disclosure, the user interface 169 can provide an efficient reservation workflow by allowing the user to select a single day reservation or a multi-day reservation without additional user interaction.

In examples of the disclosure, users are not forced to select a multi-day reservation at the start of the reservation workflow. Instead, users can select more than one day within the calendar user interface element 301 to move between a single day reservation and a multi-day reservation.

Figure 4:
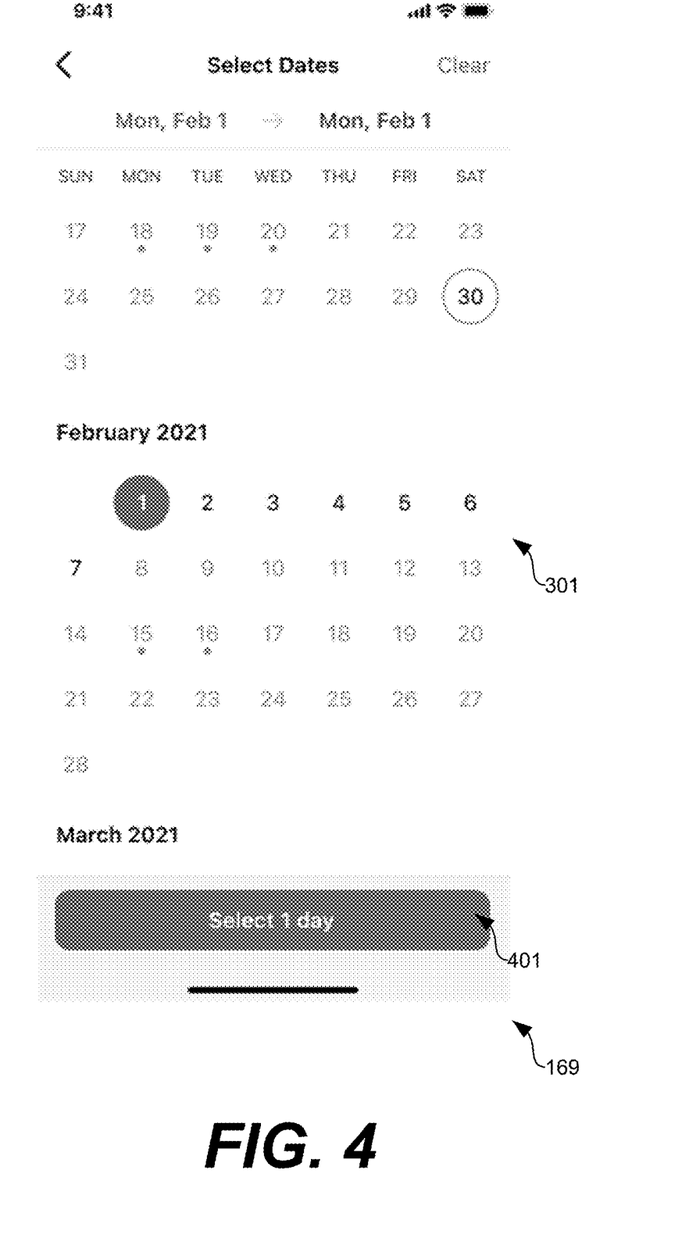

Continuing the example of FIGS. 2-3, reference is now made to FIG. 4. In FIG. 4, the user has selected a single day for a reservation in the user interface 169 provided by the reservation system 122. The selection can be made by tapping or otherwise selecting a day in the calendar user interface element 301. A single day reservation confirmation user interface element 401 has been rendered in the user interface 169 that allows the user to confirm the choice of a single day reservation due to selection of a single day in the calendar user interface element 301.

If the user confirms the choice of a single day reservation by selecting the single day reservation confirmation user interface element 401, the user interface 169 can proceed to a reservation confirmation workflow or a physical location selection workflow depending upon whether the user has already selected the physical location before arriving at the calendar user interface element 301.

Figure 5:
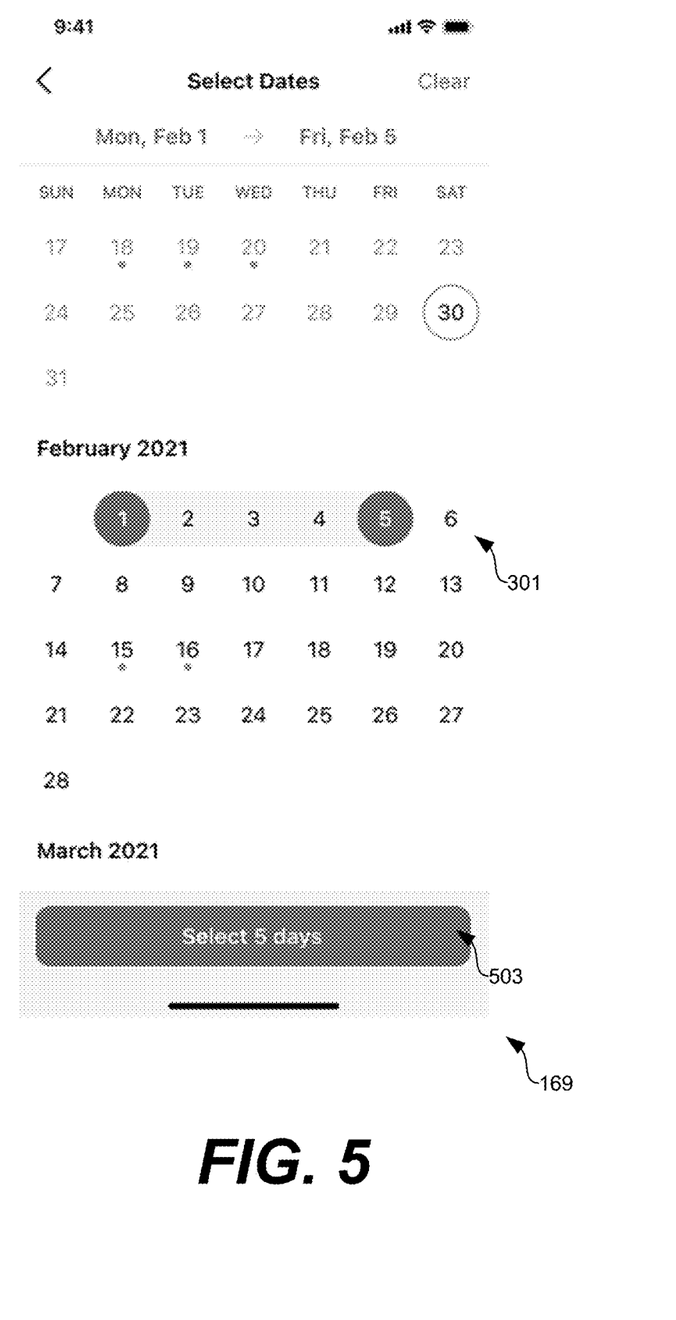

Continuing the example of FIGS. 2-4, reference is now made to FIG. 4. In FIG. 5, the user has selected a second day for a reservation in the user interface 169 provided by the reservation system 122. The selection can be made by tapping or otherwise selecting a second day in the calendar user interface element 301 that is different from the first day selected in the example shown in FIG. 4. The second day can be before or after the first day. In some implementations, the user interface 169 can validate or require that the second day that is selected be after the first day. In other implementations, the user interface 169 can select the earlier date as the first date of a date range and the later date as the second date of a date range irrespective of when the selection within the calendar user interface element 301 is made.

As shown in the example of FIG. 5, the user interface 169 can update the single day reservation confirmation user interface element 401 of FIG. 4 to a multi-day reservation confirmation user interface element 503. The user interface 169 can update the single day reservation confirmation user interface element 401 to the multi-day reservation confirmation user interface element 503 without requiring further interaction from a user. In this way, the reservation workflow can be optimized or speeded for the user because the user can move between a single day reservation request and a multi-day reservation request by selecting a second day in the calendar user interface element 301 after selecting a first day and without additional user interaction needed.

The multi-day reservation confirmation user interface element 503 has been rendered in the user interface 169 that allows the user to confirm the choice of a multi-day reservation due to selection of a second day in the calendar user interface element 301.

If the user confirms the choice of a multi-day reservation by selecting the multi-day reservation confirmation user interface element 503, the user interface 169 can proceed to a reservation confirmation workflow or a physical location selection workflow depending upon whether the user has already selected the physical location before arriving at the calendar user interface element 301.

Figure 6:
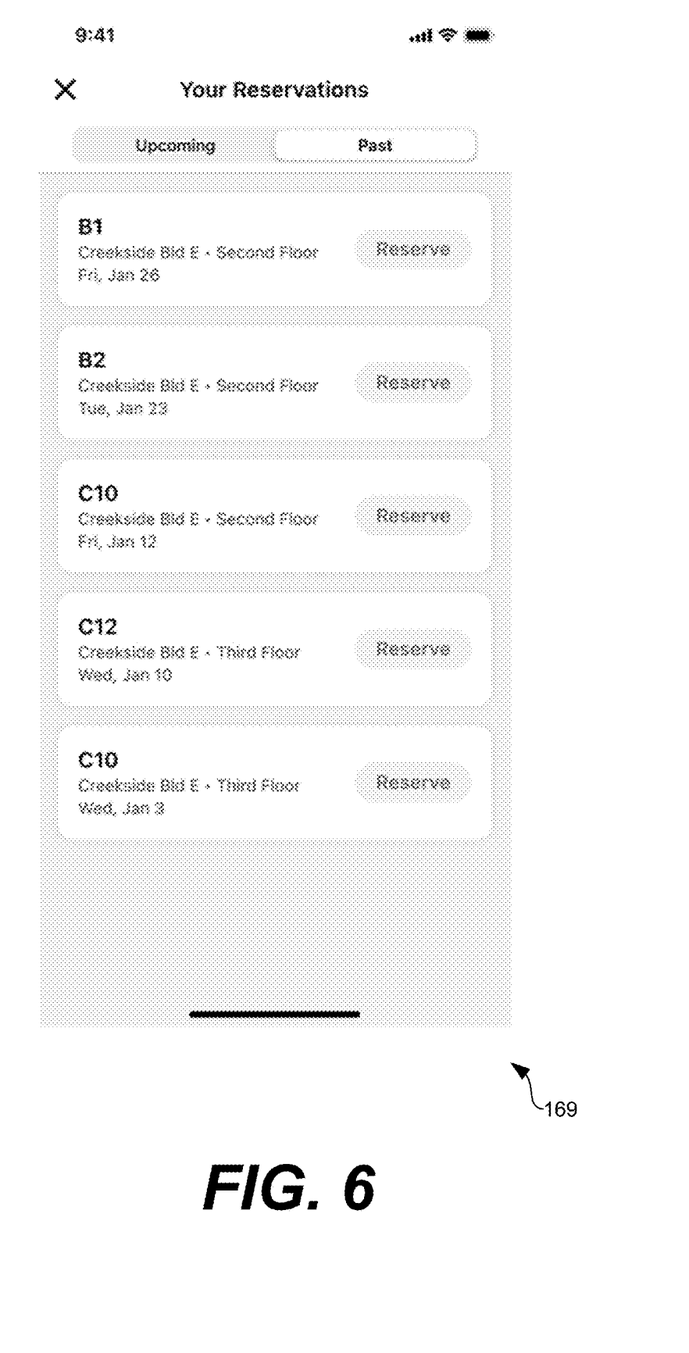

FIG. 6 depicts an alternative entry into a calendar user interface element 301 according to examples of the disclosure. In FIG. 6, an example of a user interface 169 is shown. More specifically, the user interface 169 of FIG. 6 can include a user interface that facilitates user reservation of physical locations in an office environment. In the example of FIG. 6, the user has arrived at a landing page for the reservation system 122 for a particular site within the enterprise by requesting to view historical reservation that the user has made with respect to an enterprise site.

In the user interface 169 shown in FIG. 6, the user can select a previous reservation of a physical location to start a reservation workflow to create a new reservation of the same physical location. The new reservation can be made on one or more dates that are different from the previous reservation but can correspond to the same physical location.

Figure 7:
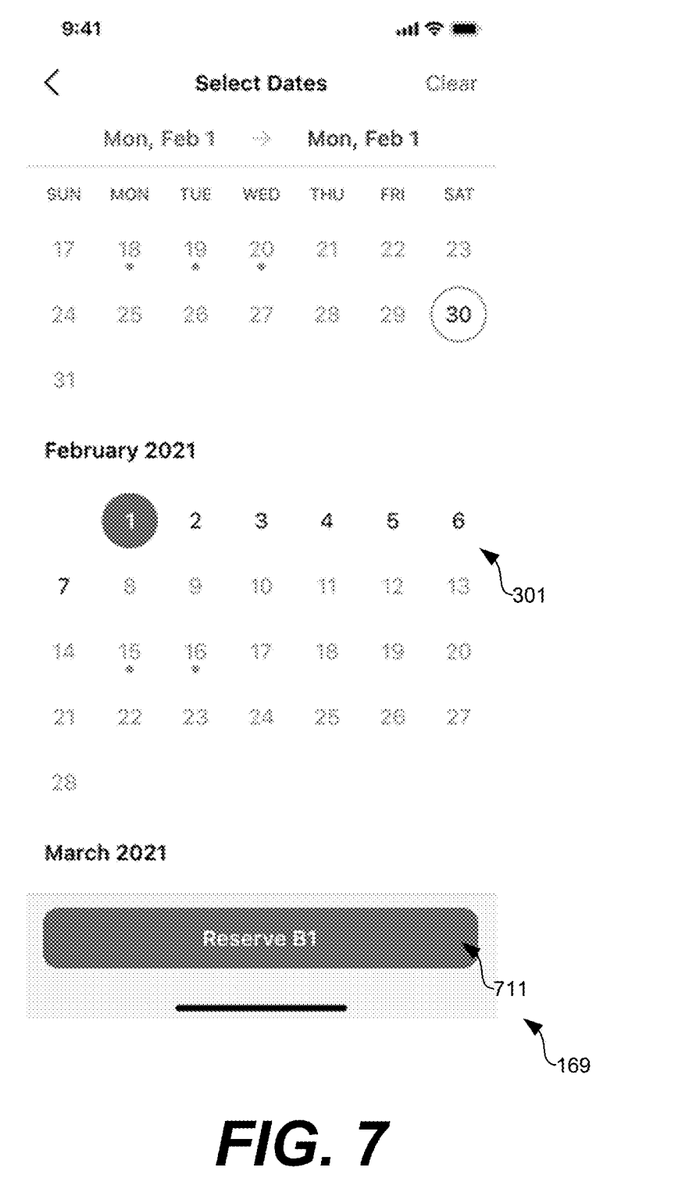

Continuing the example of FIG. 6, reference is now made to FIG. 7. FIG. 7 shows a user interface 169 that can be created by the reservation system 122 or a client application 130 after the user selects a previous reservation on which to base a new reservation. By selecting a previous reservation, the reservation system 122 can facilitate reservation of the same physical location associated with the previous reservation but on different days.

As shown in FIG. 7, the user has selected a single day in the calendar user interface element 301. Accordingly, the user interface 169 can be updated to include a reservation confirmation user interface element 711 upon selection of a day within the calendar user interface element 301 that is available to be reserved. In other words, if the reservation system 122 determines that a physical location associated with the selected previous reservation is available on the selected day in the calendar user interface element 301, a reservation confirmation user interface element 711 can be added to the user interface 169 that allows the user to continue or complete the reservation workflow.

Figure 8:
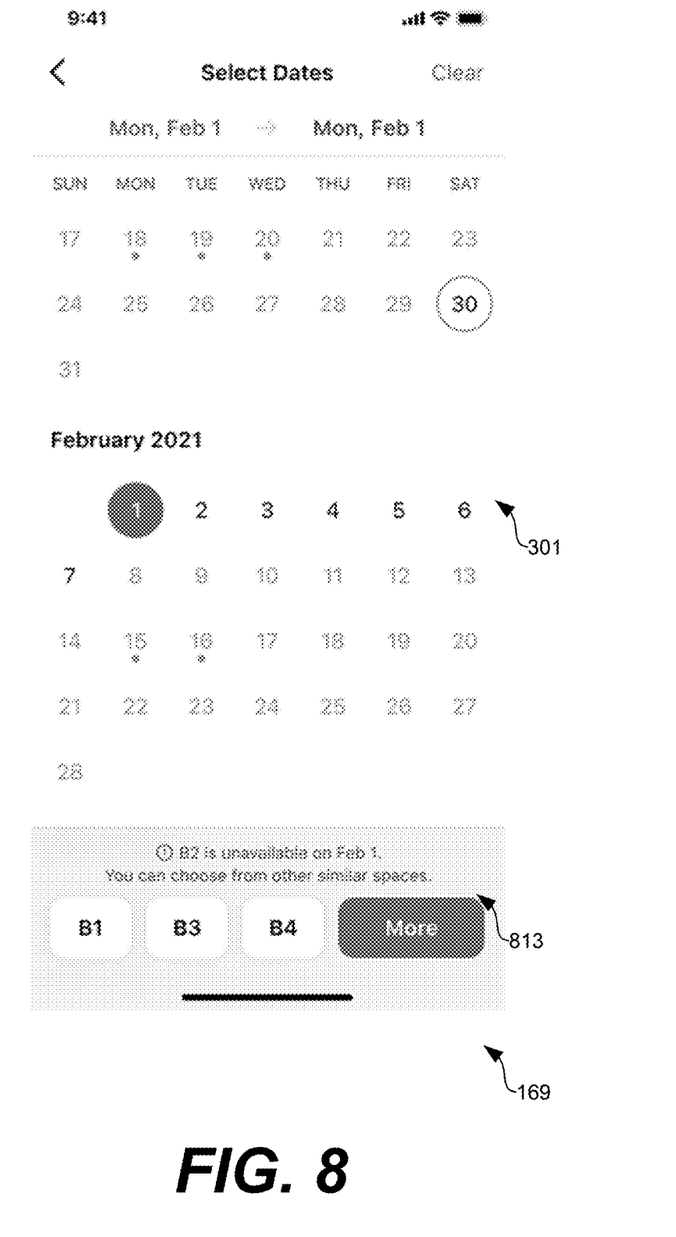

Continuing the example of FIG. 6 with an alternative example relative to FIG. 7, reference is now made to FIG. 8. FIG. 8 shows a user interface 169 that can be created by the reservation system 122 or a client application 130 after the user selects a previous reservation on which to base a new reservation. By selecting a previous reservation, the reservation system 122 can facilitate reservation of the same physical location associated with the previous reservation but on different days.

As shown in FIG. 8, the user has selected a single day in the calendar user interface element 301. However, the physical location is unavailable on the selected day. Accordingly, the user interface 169 can be updated to include an alternative location user interface element 813. The alternative location user interface element 813 can include alternate locations that have similar attributes to the physical location associated with the selected previous reservation. The reservation system 122 can identify physical locations that are available on the selected day that share one or more attributes with the physical location associated with the selected previous reservation.

In one example, the reservation system 122 can identify alternate locations that are on the same floor, are of the same type, have the same technology resources, quantity of seating, type of desk, and other attributes that can be associated with a physical location. In some examples, the alternate locations can be identified by identifying similar attributes according to a user preference. For example, a user can select ordered preferences for alternative locations that are on the same floor, of the same type, have a particular technology resource, or that have other matching attributes. In other examples, the ordered preferences can be programmed into the reservation system 122, which can suggest alternate locations without regard to user preference.

The user interface 169 can be updated with the alternative location user interface element 813 without requiring additional user interaction from the user, thereby instantly recovering to suggest alternate locations if the user's initial choice is unavailable on the selected day without requiring the user to navigate to another user interface 169. The alternative location user interface element 813 an also replace a reservation confirmation user interface element 711 or be included in the user interface 169 for multi-day reservations if the user selects more than one day in the calendar user interface element 301.

Figure 9:
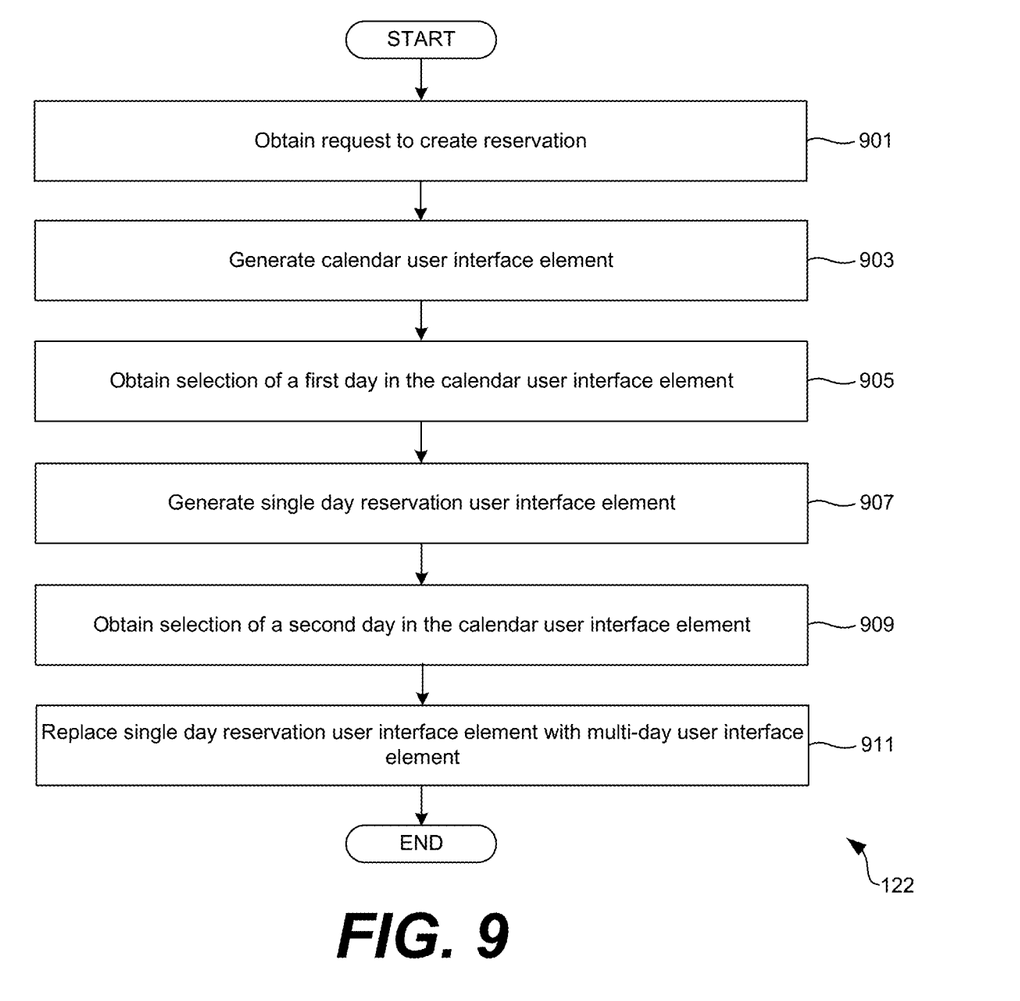

Referring now to FIG. 9, a flowchart is shown that provides one example operation of the reservation system 122 according to examples of the disclosure. The flowchart of FIG. 9 illustrates how the reservation system 122 or a client application 130 that generates a user interface 169 to facilitate a reservation workflow can optimize selection of a multi-day reservation.

Beginning with step 901, the reservation system 122 can obtain a request to create a reservation. The request can be initiated by a user through a web-based reservation portal or a client application 130 running on a client device 106. In one example, a reservation workflow can require the user to select one or more dates before selecting or suggesting a physical location on a floorplan that the user can reserve.

At step 903, the reservation system 122 can generate a calendar user interface element 301. A calendar user interface element 301 can be placed within a user interface 169 and allow a user to select a day for a single day reservation. The selected day is the day on which the user wishes to reserve a physical location. The day can be selected by tapping, clicking, or otherwise making a selection of a day in the calendar user interface element 301.

At step 905, the reservation system 122 can obtain a selection of a first day in the calendar user interface element 301. Again, the selected day is the day on which the user wishes to reserve a physical location. The day can be selected by tapping, clicking, or otherwise making a selection of a day in the calendar user interface element 301.

At step 907, the reservation system 122 can create a single day reservation confirmation user interface element 401 within the user interface 169. The single day reservation confirmation user interface element 401 can be placed within the user interface 169 below, adjacent to, or within the calendar user interface element 301. The single day reservation confirmation user interface element 401 can be an interactive user interface element that, should the user click, tap, or otherwise select the single day reservation confirmation user interface element 401, the reservation system 122 can proceed with creating a single day reservation in a reservation workflow.

At step 909, the reservation system 122 can obtain selection of a second day in the calendar user interface element 301. The second day can correspond to a second date that, along with the first day, acts as a boundary to define a date range. The date range is a range of days in which the user wishes to reserve a physical location. The second day can be selected by tapping, clicking, or otherwise making a selection of a day in the calendar user interface element 301.

At step 911, the reservation system 122 can replace the single day reservation confirmation user interface element 401 with a multi-day reservation confirmation user interface element 503 within the user interface 169. The user interface 169 an be updated with the multi-day reservation confirmation user interface element 503 without further user interaction other than the user selecting a second day to define a date range in the calendar user interface element 301.

The multi-day reservation confirmation user interface element 503 can be placed within the user interface 169 below, adjacent to, or within the calendar user interface element 301. The multi-day reservation confirmation user interface element 503 can be an interactive user interface element that, should the user click, tap, or otherwise select the multi-day reservation confirmation user interface element 503, the reservation system 122 can proceed with creating a multi-day reservation in a reservation workflow.

Thereafter, the process can proceed to completion.

Figure 10:
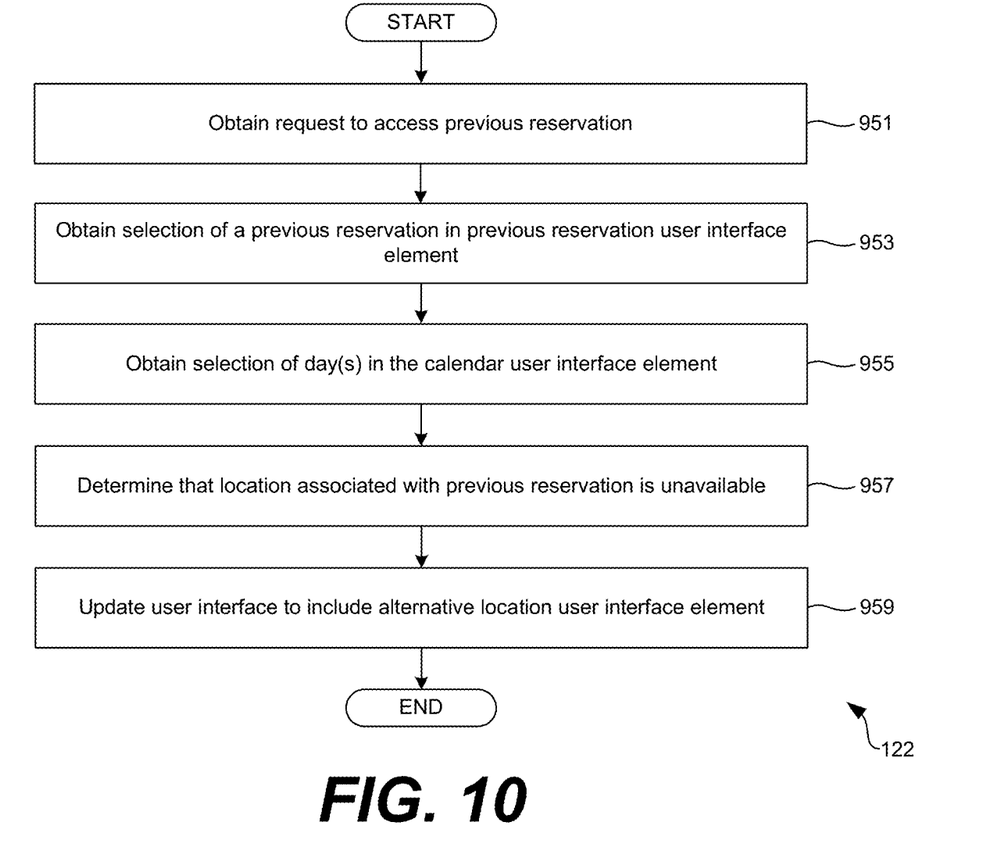

Referring now to FIG. 10, a flowchart is shown that provides one example operation of the reservation system 122 according to examples of the disclosure. The flowchart of FIG. 9 illustrates how the reservation system 122 or a client application 130 that generates a user interface 169 to facilitate a reservation workflow can optimize selection a physical location to reserve based on a previous reservation.

First, at step 951, the reservation system 122 can obtain a request to access a previous reservation associated with a user. The request can be initiated by a user through a web-based reservation portal or a client application 130 running on a client device 106. The request can comprise the user selecting a link or feature that retrieves a reservation history of the user associated with a particular enterprise site.

At step 953, the reservation system 122 can obtain a selection of a previous reservation on which to base a new reservation. The reservation system 122 can allow users to create a new reservation of a physical location that the user has previously reserved. The request can comprise the user selecting a link or feature that causes a new reservation request to be generated. The request can also cause the calendar user interface element 301 to be displayed in the user interface 169 so that the user can select one or more days to reserve the physical location associated with the previous reservation.

At step 955, the reservation system 122 can obtain a selection of a first day in the calendar user interface element 301. Again, the selected day is the day on which the user wishes to reserve a physical location. The day can be selected by tapping, clicking, or otherwise making a selection of a day in the calendar user interface element 301. In some examples of the disclosure, the user can also select multiple days in the calendar user interface element 301 to create a multi-day reservation.

At step 957, the reservation system 122 can determine whether the physical location associated with the previous reservation is unavailable during the selected day or multiple days. The reservation system 122 can make this determination based upon reservation data associated with the physical location.

At step 959, the reservation system 122 can update the user interface 169 to include an alternative location user interface element 813. The alternative location user interface element 813 can include alternate locations that have similar attributes to the physical location associated with the selected previous reservation. The reservation system 122 can identify physical locations that are available on the selected day that share one or more attributes with the physical location associated with the selected previous reservation.

In one example, the reservation system 122 can identify alternate locations that are on the same floor, are of the same type, have the same technology resources, quantity of seating, type of desk, and other attributes that can be associated with a physical location. In some examples, the alternate locations can be identified by identifying similar attributes according to a user preference. For example, a user can select ordered preferences for alternative locations that are on the same floor, of the same type, have a particular technology resource, or that have other matching attributes. In other examples, the ordered preferences can be programmed into the reservation system 122, which can suggest alternate locations without regard to user preference.

The user interface 169 can be updated with the alternative location user interface element 813 without requiring additional user interaction from the user, thereby instantly recovering to suggest alternate locations if the user's initial choice is unavailable on the selected day. The alternative location user interface element 813 an also replace a reservation confirmation user interface element 711 or be included in the user interface 169 for multi-day reservations if the user selects more than one day in the calendar user interface element 301.

The alternative location user interface element 813 can include one or more links that the user can follow to reserve a suggested alternative location on the day or over a date range that the user defined using the calendar user interface element 301.

Thereafter, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 130 and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 136 upon which a user interface 169 generated by the client application 130 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the space management service 115, the client application 130, and other various systems described herein can be embodied in software or code executed by general-purpose hardware as discussed above, as an alternative the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function (s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    a computing device comprising at least one hardware processor; and
    program instructions stored in memory and executable in the computing device that, when executed, direct the computing device to:
        obtain a request to create a reservation for an item;
        generate a calendar user interface element within a user interface;
        obtain a first selection of a first date within the calendar user interface element, wherein the first date is a single calendar date on the calendar user interface element;
        in response to detecting the first selection of the first date and without selection of any other date on the calendar user interface element, generate a single day reservation confirmation user interface element within the user interface, wherein the single day reservation confirmation user interface element confirms a single day reservation in response to activating the single day reservation confirmation user interface element;
        obtain a second selection of a second date within the calendar user interface element;
        in response to detecting the second selection of the second date, determine whether the item is available for reservation for a duration between the first date and the second date;
        in response to determining that the item is available for reservation for the duration between the first date and the second date, replace the single day reservation confirmation user interface element with a multi-day reservation confirmation user interface element within the user interface upon the second selection of the second date and without further user interaction with the user interface, wherein the multi-date reservation confirmation user interface element confirms a multi-day reservation of the item for the duration between the first date and the second date in response to activating the multi-date reservation confirmation user interface element; and
        in response to determining that the item is not available for reservation for the duration between the first date and the second date, select an alternative item having one or more matching attributes with the item, the one or more matching attributes specified by a set of user-provided ordered preferences; and generate, within the user interface, an alternative item user interface element associated with initiating a multi-day reservation for the alternative item specified by the first date and the second date.

2. The system of claim 1, wherein the single day reservation confirmation user interface element initiates a request for the single day reservation of the item on the first date in an instance in which a user selects the single day reservation confirmation user interface element.

3. The system of claim 1, wherein the program instructions cause an earlier of the first date or the second date to be an initial date of the duration and a later of the first date or the second date to be an ending date of the duration.

4. The system of claim 1, wherein the single day reservation confirmation user interface element is generated within the user interface upon selection of the first date and before the second selection of the second date.

5. The system of claim 1, wherein the item and the alternative item are locations within a building and wherein the one or more matching attributes include a floor of the building shared by the locations.

6. The system of claim 1, wherein the item and the alternative item are locations within a building, and wherein the one or more matching attributes include a technology resource available within both locations.

7. A system, comprising:
a computing device comprising at least one hardware processor; and
program instructions stored in memory and executable in the computing device that, when executed, direct the computing device to:
obtain a request to access a previous reservation associated with an item;
generate a previous reservation user interface element within a user interface;
obtain a selection of a previous reservation in the previous reservation user interface element;
generate a calendar user interface element within the user interface;
obtain a first selection of a first date within the calendar user interface element wherein the first date is a single calendar date on the calendar user interface element;
in response to detecting the first selection of the first date and without selection of any other date on the calendar user interface element, generate a reservation confirmation user interface element within the user interface, wherein the reservation confirmation user interface element confirms a single day reservation in response to activating the confirmation user interface element;
obtain a second selection of a second date within the calendar user interface element;
in response to detecting the second selection of the second date, determine whether the item is available for reservation for a duration between the first date and the second date;
in response to determining that the item is available for reservation for the duration between the first date and the second date, replace the reservation confirmation user interface element with a multi-day reservation confirmation user interface element within the user interface upon the second selection of the second date and without further user interaction with the user interface, wherein the multi-date reservation confirmation user interface element confirms a multi-day reservation of the item for the duration between the first date and the second date in response to activating the multi-date reservation confirmation user interface element; and in response to determining that the item is not available for reservation for the duration between the first date and the second date,
select an alternative item having one or more matching attributes with the item, the one or more matching attributes specified by a set of user-provided ordered preferences; and
generate, within the user interface, an alternative item user interface element that, when selected, initiates a multi-day reservation for the alternative item specified by the first date and the second date.

8. The system of claim 7, wherein the program instructions cause an earlier of the first date or the second date to be an initial date of the duration of the multi-day reservation and a later of the first date or the second date to be an ending date of the duration of the multi-day reservation.

9. The system of claim 7, wherein the alternative item user interface element comprises at least one link facilitating the multi-day reservation of the alternative item.

10. The system of claim 7, wherein the single day reservation confirmation user interface element is generated within the user interface upon selection of the first date and before the second selection of the second date.

11. A method comprising:
obtaining a request to create a reservation associated with an item;
generating a calendar user interface element within a user interface;
obtaining a first selection of a first date within the calendar user interface element, wherein the first date is a single calendar date on the calendar user interface element;
in response to detecting the first selection of the first date and without selection of any other date on the calendar user interface element, generating a single day reservation confirmation user interface element within the user interface, wherein the single day reservation confirmation user interface element confirms a single day reservation in response to activating the single day reservation confirmation user interface element;
obtaining a second selection of a second date within the calendar user interface element;
in response to detecting the second selection of the second date, determining whether the item is available for reservation for a duration between the first date and the second date;
in response to determining that the item is available for reservation for the duration between the first date and the second date, replacing the single day reservation confirmation user interface element with a multi-day reservation confirmation user interface element within the user interface upon the second selection of the second date and without further user interaction with the user interface, wherein the multi-date reservation confirmation user interface element confirms a multi-day reservation of the item for the duration between the first date and the second date in response to activating the multi-date reservation confirmation user interface element; and in response to determining that the item is not available for reservation for the duration between the first date and the second date,
  selecting an alternative item having one or more matching attributes with the item, the one or more matching attributes specified by a set of user-provided ordered preferences; and
  generating, within the user interface, an alternative item user interface element associated with initiating a multi-day reservation for the alternative item specified by the first date and the second date.

12. The method of claim 11, wherein the single day reservation confirmation user interface element initiates a request for the single day reservation of the item on the first date in an instance in which a user selects the single day reservation confirmation user interface element.

13. The method of claim 11, further comprising causing an earlier of the first date or the second date to be an initial date of the duration and a later of the first date or the second date to be an ending date of the duration.

14. The method of claim 11, wherein the single day reservation confirmation user interface element is generated within the user interface upon selection of the first date and before the second selection of the second date.

15. The method of claim 11, wherein the item and the alternative item are locations within a building and wherein the one or more matching attributes include a floor of the building shared by the locations.

16. The method of claim 11, wherein the item and the alternative item are locations within a building, and wherein the one or more matching attributes include a technology resource available within both locations.

* * * * *